US 6,538,816 B2

United States Patent
Fuchs et al.

(10) Patent No.: US 6,538,816 B2
(45) Date of Patent: Mar. 25, 2003

(54) MICRO-ELECTRO MECHANICAL BASED OPTICAL ATTENUATOR

(75) Inventors: R. Wayne Fuchs, Ottawa (CA); Barrie Keyworth, Stittsville (CA)

(73) Assignee: JDS Uniphase Inc., Ottawa ( * ) Notice: Subject to any disclaimer, the term of this patent is extended or adjusted under 35 U.S.C. 154(b) by 157 days.

(21) Appl. No.: 09/738,326

(22) Filed: Dec. 18, 2000

(65) Prior Publication Data

US 2002/0076191 A1 Jun. 20, 2002

(51) Int. Cl.⁷ .......................... G02B 27/00; G02B 6/00; H01S 3/08
(52) U.S. Cl. .......................... 359/578; 359/579; 372/92; 372/99; 385/140
(58) Field of Search .............................. 385/25, 33–35, 385/18, 23, 140; 359/578, 579, 577; 372/92, 99

(56) References Cited

U.S. PATENT DOCUMENTS

| | | | |
|---|---|---|---|
| 4,516,827 A | 5/1985 | Lance et al. | 350/96.15 |
| 5,208,880 A | 5/1993 | Riza et al. | 385/18 |
| 5,915,063 A | 6/1999 | Colbourne et al. | 385/140 |
| 6,137,941 A | 10/2000 | Robinson | 385/140 |
| 6,285,504 B1 * | 9/2001 | Diemeer | 359/578 |

* cited by examiner

Primary Examiner—Frank G. Font
Assistant Examiner—Michael P Mooney
(74) Attorney, Agent, or Firm—Neil Teitelbaum (57) ABSTRACT

The present invention relates to a micro-electromechanical optical attenuator and a method of operating the same. In prior art attenuators, the attenuation obtained from a deflection angle does not change uniformly over a range of interest. In addition, over a range of interest the required voltage to obtain a desired deflection changes as a nonlinear function. The cause of the poor control of prior art attenuators can be viewed graphically by examining the attenuation as a function of deflection, and the angle of deflection as a function of voltage. These functions combine to produce a very unstable voltage to attenuation response function. The present invention has found that by operating an electrostatic drive of a reflective optical attenuator in order to attain a low loss state with the mirror in a fully deflected position, the drive voltage can be reduced to increase attenuation in a very stable nearly linear attenuation vs. drive voltage response. The non-linearity of the attenuation vs. deflection function is countered by a deflection vs. voltage response that becomes increasingly stable with decreasing voltage. A resulting attenuation vs. voltage curve gives a superior, stable and nearly linear response. To achieve the novel drive method in accordance with the present invention, an adjustable substrate is provided for supporting the mirror drive which can be positioned to support the mirror at a maximum deflection position in a neutral, unpowered state.

13 Claims, 7 Drawing Sheets

ACTIVE ADJUSTMENT OF
SUBSTRATE ANGLE

MICRO-ELECTRO MECHANICAL BASED OPTICAL ATTENUATOR

FIELD OF THE INVENTION

The present invention relates to a micro-electromechanical optical attenuator and a method of operating the same.

BACKGROUND OF THE INVENTION

A micro-electromechanical (MEMs) optical attenuator is an electrostatically driven tilting micromirror device within a lens system that directs an optical signal onto the micromirror surface. Attenuation of the optical signal is obtained by applying an electrical signal to the micromirror device causing its reflecting surface to tilt, and thus deflecting a portion of the optical signal away from the lens system. Incomplete coupling of the signal results from the deflection. Thus, the amount of deflection controls the amount of attenuation. It is desired to control the level of attenuation precisely.

However, control of the attenuation is difficult for two reasons. The attenuation obtained from a deflection angle does not change uniformly over a range of interest. In addition, over a range of interest the required voltage to obtain a desired deflection changes as a non-linear function. Prior art attenuators of this type suffer from poor control because, viewed graphically, the attenuation as a function of deflection, and the angle of deflection as a function of voltage combine to produce a very unstable voltage to attenuation response function. Within the deflection range of interest a large change in voltage may cause a relatively small change in attenuation, and within the same range a small change in voltage may cause a large change in attenuation.

Reflective attenuators are also used in an array to construct a dynamic gain equalizer (DGE) which works on the same principle and suffers from the same unstable response. A dynamic gain equalizer is used to equalize the gain for all channels in an optical amplifier. Typically a DWDM/WDM system will use an amplifier to regenerate the optical signals in all channels. However, the gain is usually not equal for each channel. By attenuating the channels with too much gain, the gain over all channels can be equalized. Individual channels are demultiplexed and simultaneously directed to a DGE comprising an array of optical attenuators for selective gain equalization.

There is a need to provide a micro-electromechanical (MEMs) attenuator or a dynamic gain equalizer with a more stable controlled response.

SUMMARY OF THE INVENTION

The present invention has found that by operating the electrostatic drive of an attenuator such that a low loss state is attained with the mirror in a fully deflected position, the drive voltage can be decreased to increase attenuation in a very stable nearly linear attenuation vs. drive voltage response. The non-linearity of the attenuation vs. deflection function is countered by a deflection vs. voltage response that becomes increasingly stable with decreasing voltage. A resulting attenuation vs. voltage curve gives a superior, nearly linear response.

Accordingly, the present invention provides a method for controlling a reflective attenuator in an optical system, having a lens system for directing a beam of light and a mirror for reflecting the directed beam of light, the mirror having a drive for selectively deflecting the mirror to achieve a desired attenuation comprising the steps of:
establishing a maximum deflection angle of the mirror corresponding to a maximum desired attenuation value in the optical system;
supporting the mirror drive in an unpowered state to position the mirror at the maximum deflection angle;
applying a voltage to the mirror drive to drive the mirror to a position to achieve optimum coupling; and
decreasing the applied voltage to the drive system to permit the mirror to return to a deflection position between optimum coupling and the maximum deflection angle to obtain a selected attenuation.

In a further embodiment the present invention provides a reflective optical attenuator comprising:
a lens system for directing a beam of light;
a mirror for reflecting the directed beam of light at least partially back to the lens system, the mirror having a drive system for selectively deflecting the mirror;
a support for supporting the drive system in an unpowered state to position the mirror at a selected maximum deflection angle;
wherein an increasing voltage applied to the drive system decreases the attenuation until optimum coupling is reached, and releasing a voltage applied increases attenuation until the selected maximum deflection angle is reached.

Advantageously, the present invention provides an attenuator that has a nearly linear response enabling stable deflection to achieve a desired attenuation. In accordance with the present invention, the attenuator requires very low voltage. In the optimum coupling to low loss state the attenuation vs. voltage response is quite insensitive, thus a small tilt offset in the system does not affect performance.

BRIEF DESCRIPTION OF THE FIGURES

Exemplary embodiments of the invention will now be described in conjunction with the drawings, in which:

FIG. 3b is a graph of loss versus drive voltage obtained by solving the curve of attenuation versus deflection angle of FIG. 2 and drive voltage versus deflection angle of FIG. 3a;

FIG. 6b is a graph of loss versus drive voltage obtained by solving the curve of attenuation versus deflection angle of FIG. 2 and drive voltage versus deflection angle of FIG. 6a;

Like numerals are used throughout to designate like elements.

DETAILED DESCRIPTION OF PREFERRED EMBODIMENTS

Figure 1A:
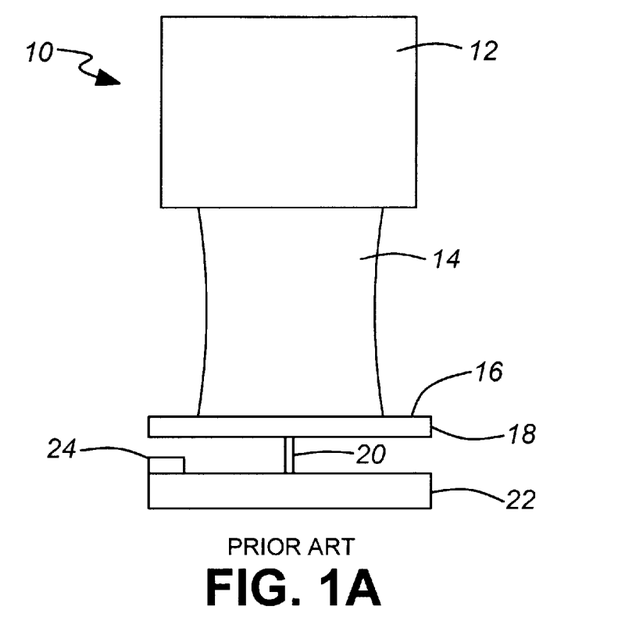
FIG. 1a is a schematic illustration of a prior art reflective attenuator shown in the low loss, optimum coupling configuration.
Figure 1B:
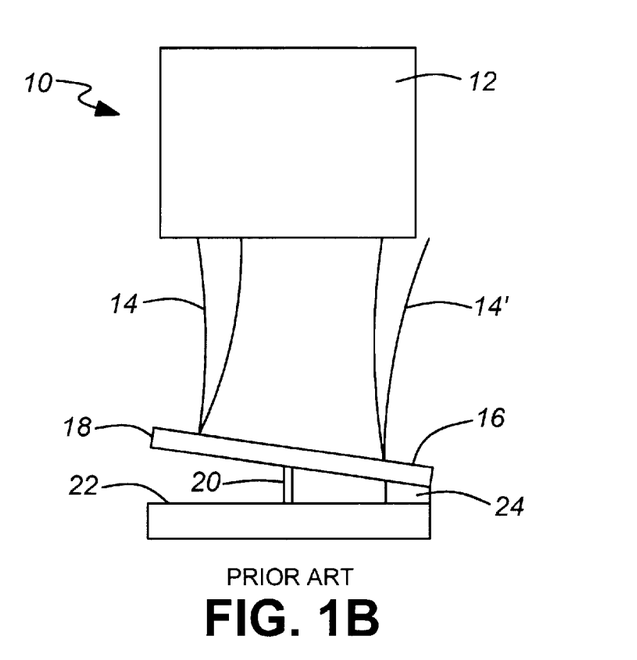
FIG. 1b is the prior art attenuator of FIG. 1a shown in the high loss configuration.

Looking at FIGS. 1a and 1b, a standard prior art attenuator arrangement 10 is shown schematically. An optical system 12 is shown generally it includes an optical coupling and lens system for directing a beam of light 14 to the reflective surface 16 of the mirror 18. The mirror 18 is supported by a fulcrum hinge 20 above a substrate 22 to permit angular deflection. As shown in FIG. 1a in a low loss state, the mirror 18 is positioned to reflect the beam of light 14 along a return path substantially identical to the path the beam 14 was launched on from the optical system 12. Thus the beam 14 is returned to the optical system at an angle for optimum coupling. A drive system deflects the mirror as a response to increasing voltage until the maximum deflection, highest attenuation is reached. In the high loss state shown in FIG. 1b, the position of the mirror 18 is changed and the beam is reflected along a different optical return path 14' which is returned to the optical system 12 at an angle which does not enable optimum coupling, and attenuation occurs. The mirror 18 is positioned against a hard stop 24 to establish a fixed high loss position.

Figure 2:
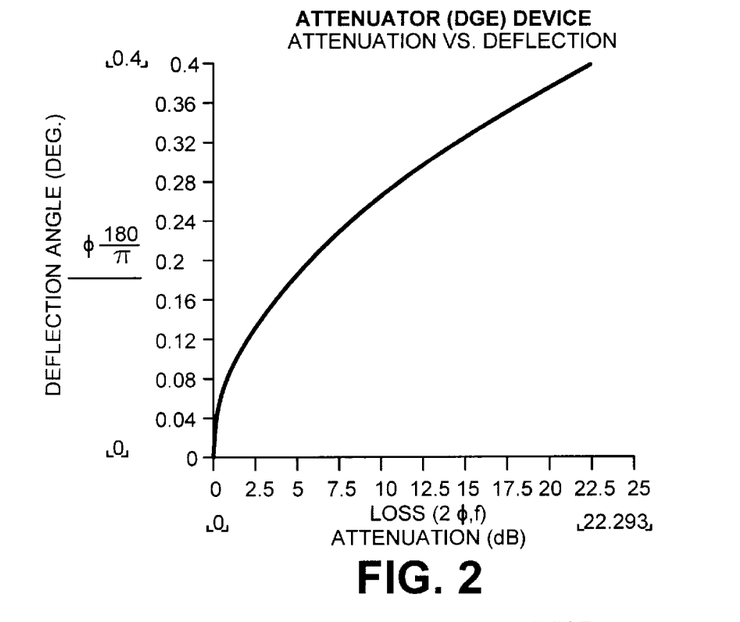
FIG. 2 is a sample graph of attenuation versus deflection angle.

FIG. 2 is a graph illustrating attenuation versus deflection for a particular optical system. Deflection angle is plotted in degrees, $\Phi*180/\Pi$. Loss is plotted as attenuation in dB, in this example loss is a function of $(2\Phi,f)$. The curve will vary for each device. However, generally attenuation increases exponentially with deflection angle.

Figure 3A:
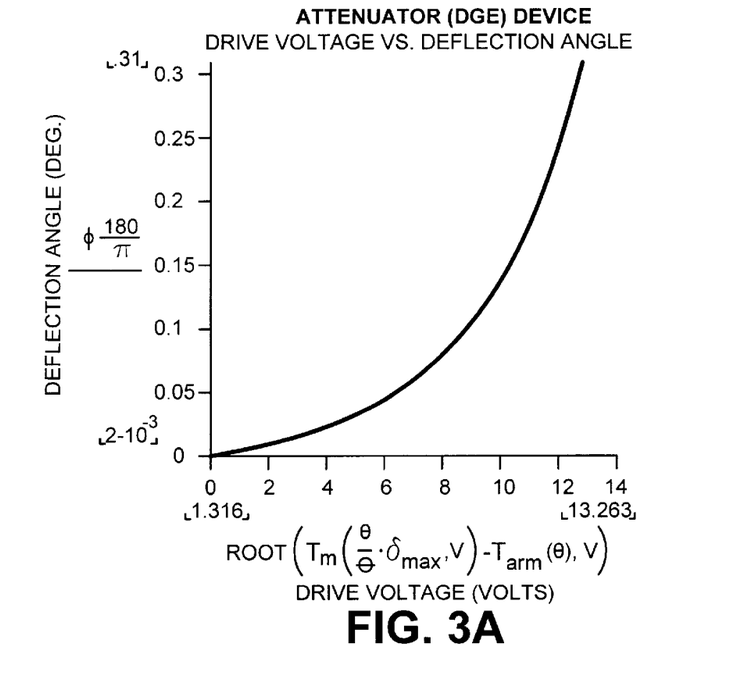
FIG. 3a is a graph of drive voltage versus deflection angle for the prior art device of FIG. 1.

FIG. 3a is a graph illustrating a drive voltage versus deflection angle for the prior art device of FIGS. 1a and 1b. This curve is increasingly unstable with increasing voltage. The instability in the deflection angle with increasing drive voltage is a well understood phenomenon of electrostatically driven devices, which results from the diminishing distance between the drive electrodes as the mirror rotates.

Figure 3B:
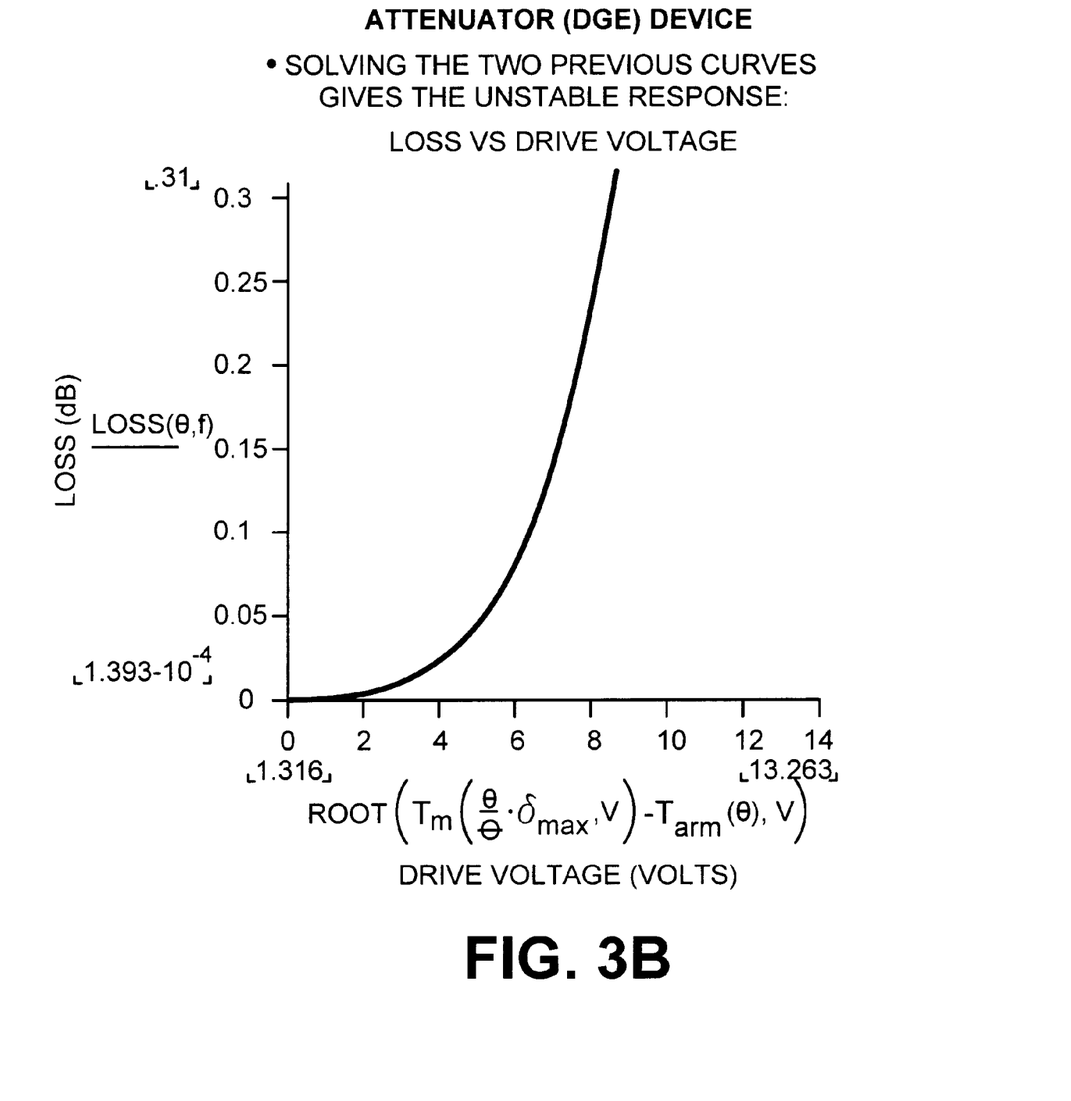

FIG. 3b is a graph illustrating the solution of the graphs of FIG. 2 and FIG. 3a, showing attenuation versus drive voltage. This graph shows a highly unstable response.

Figure 4:
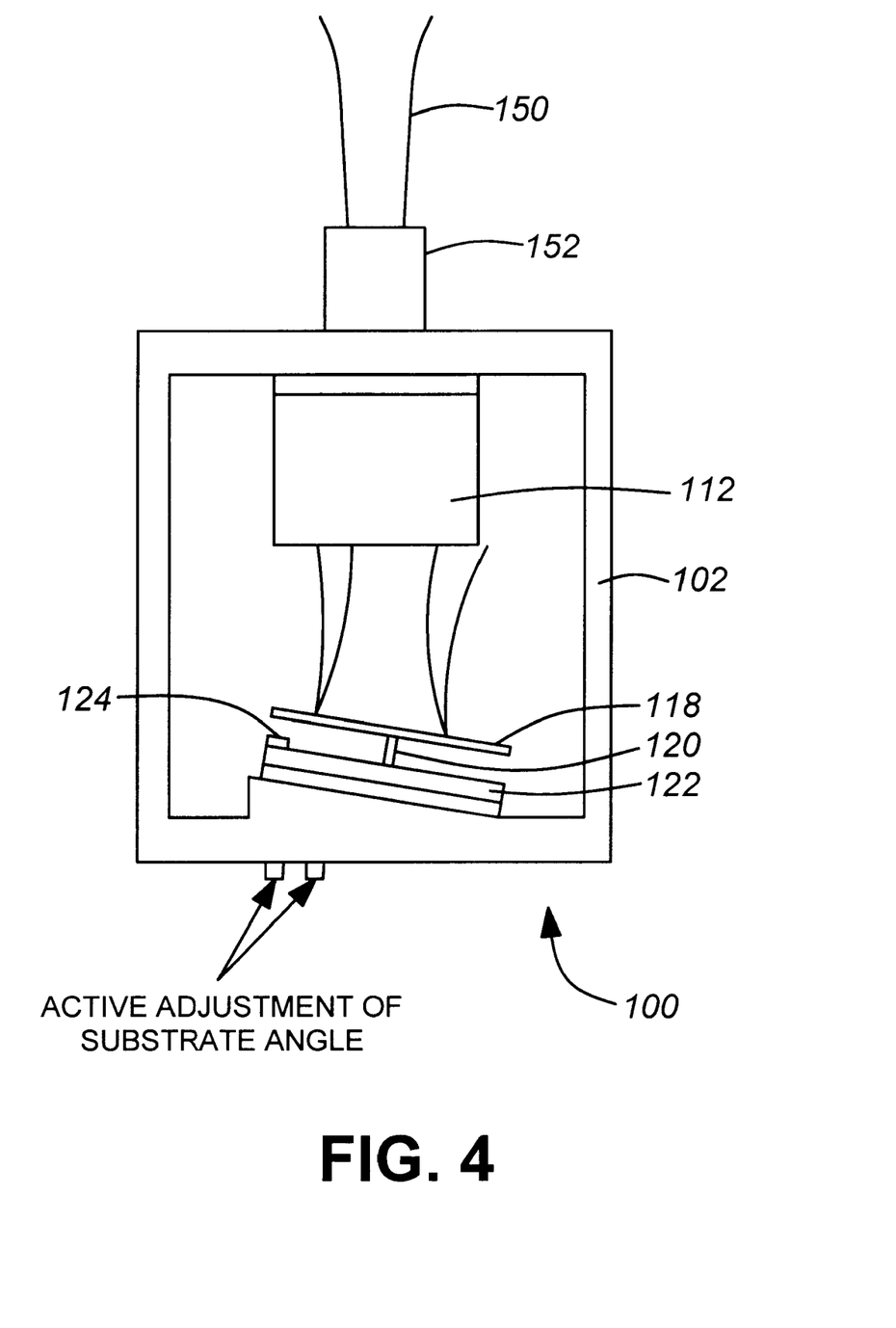
FIG. 4 is a micro-electromechanical optical attenuator in accordance with the present invention.

FIG. 4 is an attenuator 100 in accordance with the present invention. The attenuator 100 is constructed within a housing 102 which supports the optical system 112, the substrate 122, fulcrum hinge 120 and mirror 118. The substrate 122, fulcrum hinge 120 and mirror 118 are integrally formed as a microelectromechanical structure. The attenuator 100 is optically coupled to an optical network or light source through optical fibers 150 coupled to the attenuator 100 through a fiber tube 152 for strain relief. Unlike the prior art attenuator system 10, the substrate 122 supporting the mirror 118 of the attenuator 100 in accordance with the present invention is positioned at a selected angle corresponding approximately to the highest loss state. Thus, when the mirror 118 and hinge 120 are in a neutral position requiring no drive voltage, the attenuator 100 provides maximum attenuation. Voltage applied to the drive system causes the mirror 118 to be deflected to an optimum coupling position. Decreasing the applied voltage allows the mirror 118 to return to a deflection position for selected attenuation. The decrease in voltage corresponds to a nearly linear increase in attenuation. The drive system (not shown) typically generates a DC potential difference between electrodes (not shown) and the mirror 118, such as by rail voltage, CMOS circuitry, or discrete power supplies. Alternatively an AC square wave drive voltage could be applied across the substrate and mirror. The position of the substrate 122 can be adjusted, by threaded positioners or other adjustable positioning mechanism, to set the maximum desired attenuation.

Figure 5A:
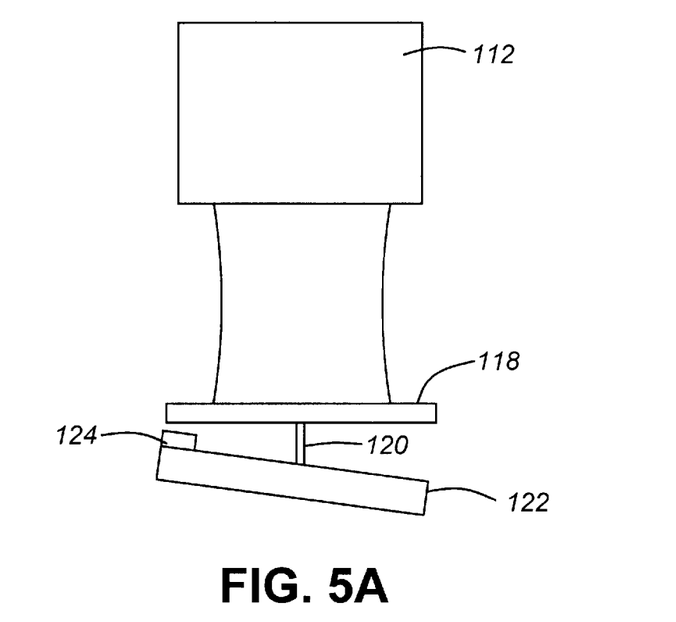
FIG. 5a is a schematic illustration of the mirror and lens of the attenuator of FIG. 4, shown in the low loss, optimum coupling configuration.
Figure 5B:
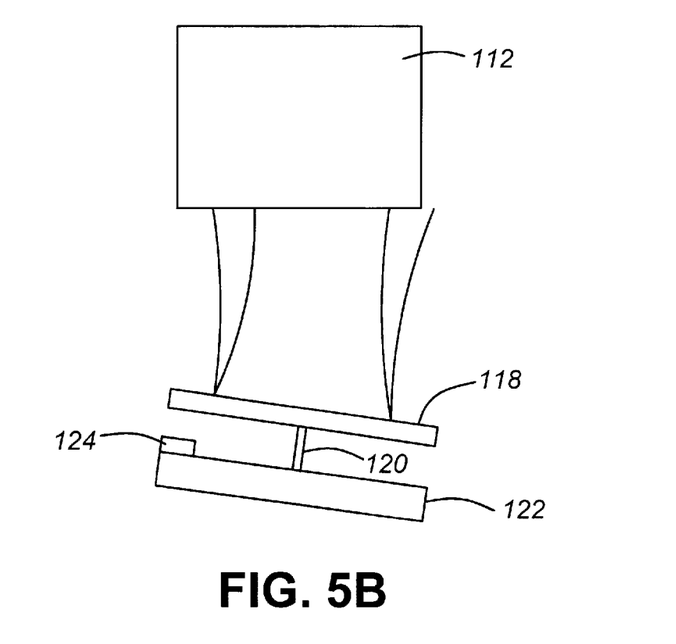
FIG. 5b is a schematic illustration of the mirror and lens of the attenuator of FIG. 4, shown in the high loss configuration.

In accordance with the present invention, when a voltage is applied to drive the mirror 118, as can be seen in FIGS. 5a and 5b, the mirror position is rotated to a low loss, optimum coupling position. The mirror 118 is driven to a negative angle approximately equal to the maximum deflection angle to achieve optimum coupling. The hard stop 124 stops the mirror 118 at a fixed position. The hard stop 124 may be positioned beyond the optimum coupling position, so that the mirror 118 is positioned for optimum coupling before reaching the hard stop 124, to provide flexibility for tuning or compensation.

Figure 6A:
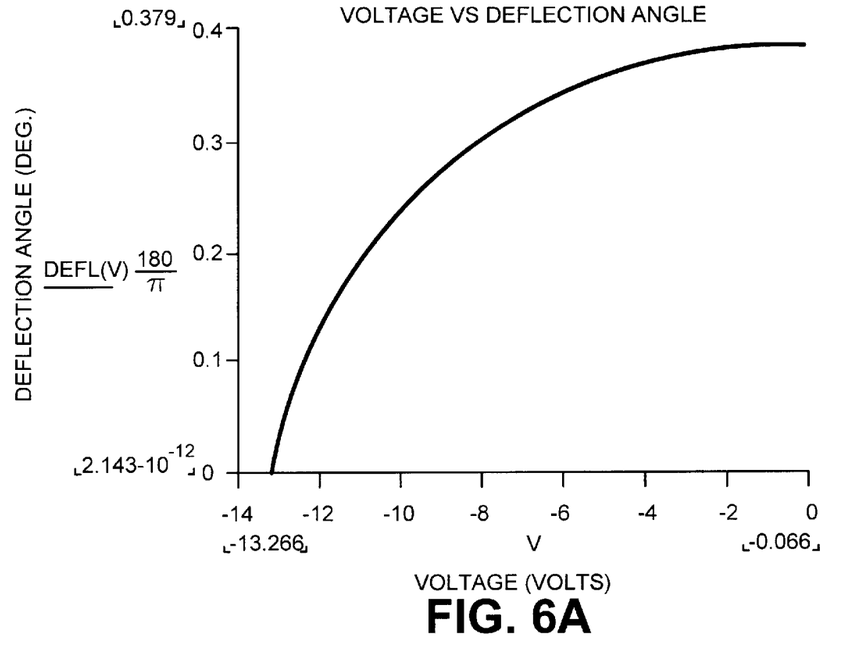
FIG. 6a is a graph of drive voltage versus deflection angle for the device of FIG. 4.
Figure 6B:
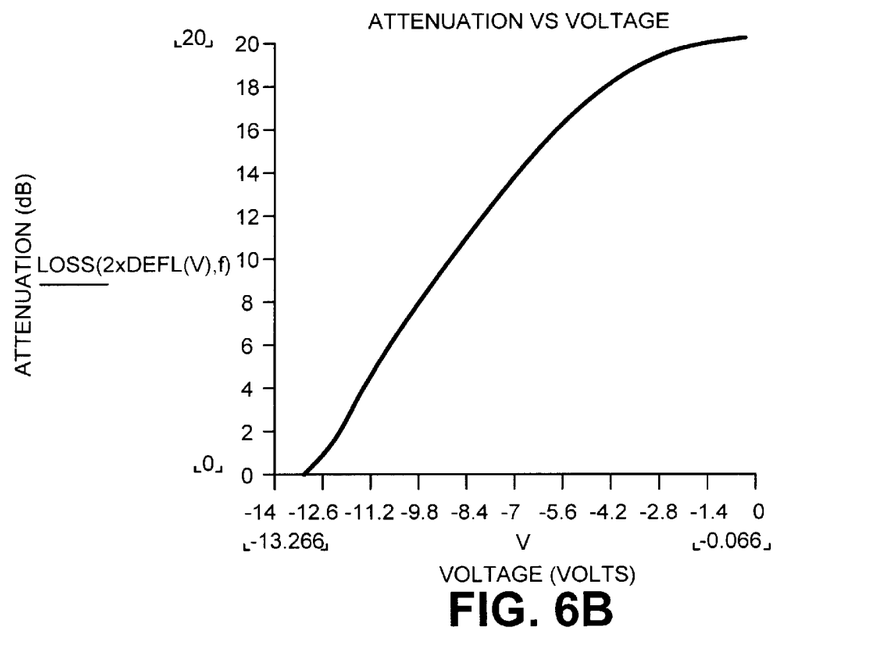

The advantage of operating the attenuator 100 in this reverse configuration is evident from the graphs of FIGS. 6a and 6b. In order to counter the nonlinearity of the deflection versus loss curve of FIG. 2, a deflection versus voltage response is required that becomes increasingly stable with voltage. The graph of FIG. 6a shows such a curve for the attenuator of FIG. 4. The solution of FIG. 2 and FIG. 6a gives a good near linear response shown in FIG. 6b.

In designing an attenuator in accordance with the present invention there will be a different attenuation versus deflection curve for each optical system. A desired voltage versus deflection curve to solve with the attenuation versus deflection curve is first sought within constraints of the optomechanical design. Within constraints of the mirror dimensions, reflectivity and flatness, hinge dimensions, the deflection angle and the available drive voltage, design modifications can be made to achieve the desired response curve. The mirror thickness and material selection affect the flatness and reflectivity. The electrode separation can be adjusted in response to mirror dimensions and required deflection angle. The hinge construction, particularly its dimensions (l×w×t) and material, affects the required drive voltage. If the desired response curve cannot be obtained within these constraints alone, adjustment to the optics may also be necessary. An iterative design process within these design constraints yields a near linear and stable attenuation versus drive voltage response curve.

In operation, the attenuator 100 is positioned in the neutral maximum loss position. This position is adjusted by positioning the substrate 122 as necessary. The drive voltage is then applied to position the mirror to the low loss optimum coupling position. A selected attenuation is then achieved by allowing the voltage to decrease and rotate the mirror 118 to the selected deflection position and desired attenuation.

When the mirror 118 is positioned against the hard stop 124 electrostatic forces between the substrate 122 and the mirror 118 are prevented from causing "snap in". The hard stop may be located beyond the low loss position.

The mirror 118 can be positioned without using a hard stop 124. In this mode of operation, the electrostatic forces between the mirror 118 and the substrate 122 cause the mirror 118 to deflect unstably (snap) to the substrate 122. The mirror 118 is then aligned so as to achieve optimal optical coupling in this position. Hysteresis resulting from driving the mirror 118 to the snap-in point can be exploited to maintain the mirror in the fully deflected position while permitting the voltage to be lowered. The voltage required to drive the mirror 118 to snap-in is greater than that needed to deflect the mirror 118 only as far as the hard stop 124. The additional voltage required depends on how close the mirror 118 is to snap-in when positioned against the hard stop 124. Advantageously, the system can be operated with lower voltage requirements once the snap-in has been attained.

Figure 7A:
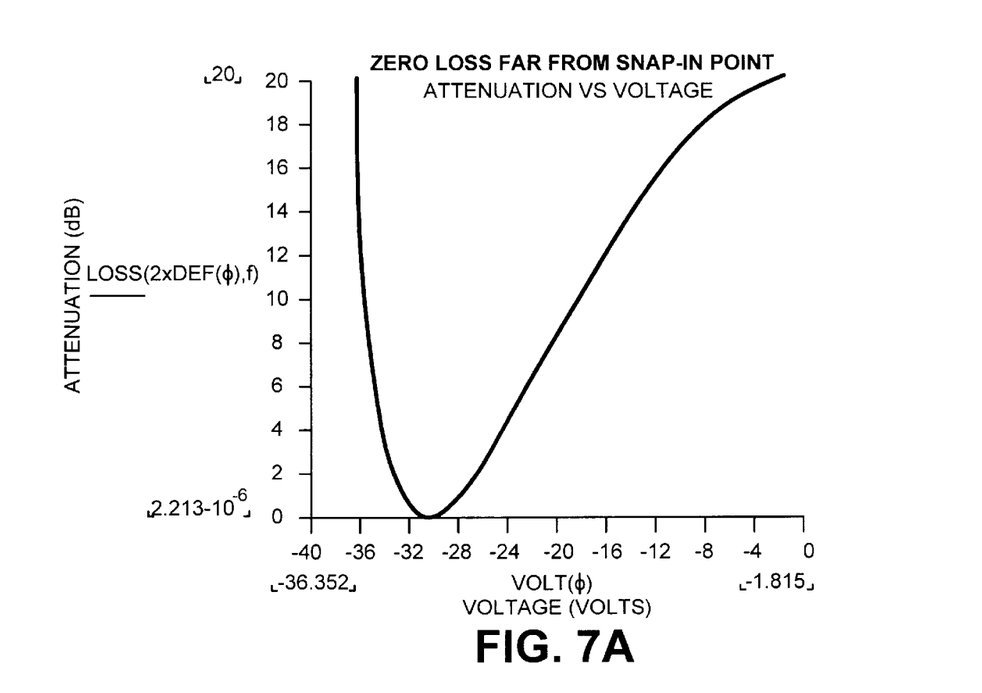
FIG. 7a is a graph of loss versus drive voltage when the low loss state is reached before the mirror is close to deflecting unstably (snap in point)
Figure 7B:
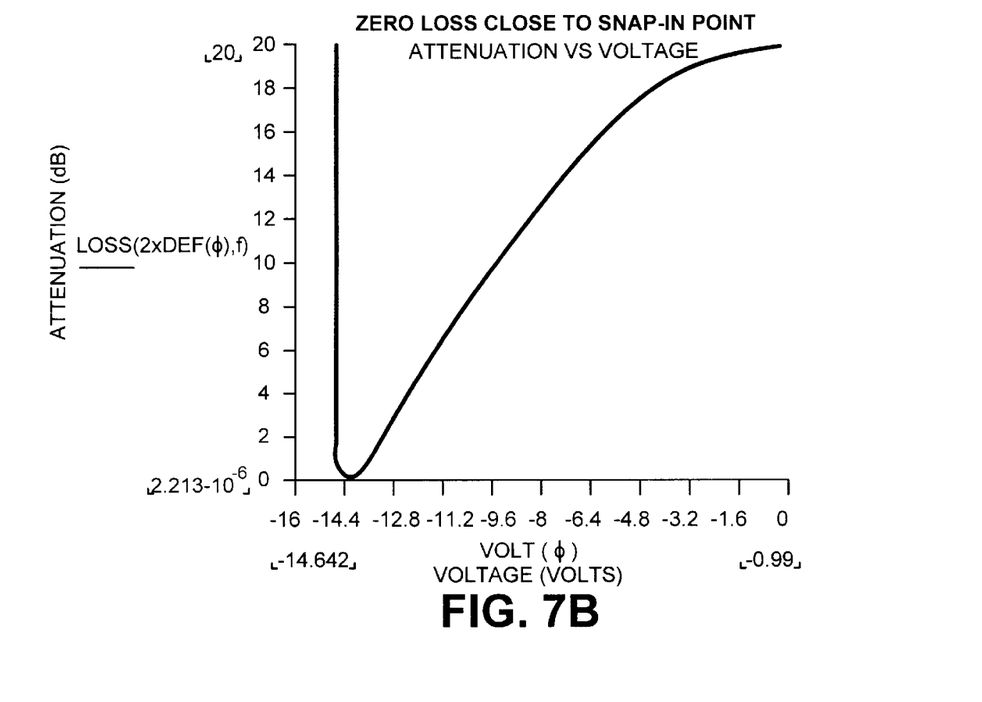
FIG. 7b is a graph of loss versus drive voltage when the low loss state is achieved close to the snap in point.

Position variation at the low loss position and at the maximum attenuation position can be well tolerated, to permit tuning adjustment. In fact, as shown in FIGS. 7a, 7b since the curve reverses at the low loss position and flattens at the maximum attenuation position, small position changes can be tolerated without causing significant attenuation change. In FIG. 7a the low loss state is positioned a relatively large distance from the snap in point and the attenuation change about the low loss position is more gradual. In FIG. 7b the low loss state is relatively close to the snap in point and the transition about the low loss position occurs more rapidly.

Of course, numerous other modifications or embodiments may be envisaged, without departing from the spirit and scope of the invention as defined in the appended claims.

What is claimed is:

1. A method for controlling a reflective attenuator in an optical system, having a lens system for directing a beam of light and a mirror for reflecting the directed beam of light, the mirror having a drive for selectively deflecting the mirror to achieve a desired attenuation comprising the steps of:

establishing a maximum deflection angle of the mirror corresponding to a maximum desired attenuation value in the optical system;

supporting the mirror drive in an unpowered state to position the mirror at the maximum deflection angle;

applying a voltage to the mirror drive to drive the mirror to a position to achieve optimum coupling; and decreasing the applied voltage to the drive system to permit the mirror to return to a deflection position between optimum coupling and the maximum deflection angle to obtain a selected attenuation.

2. A method for controlling a reflective attenuator as defined in claim 1, wherein establishing a maximum deflection angle of the mirror includes providing a substrate for supporting the mirror drive and adjusting a position of the substrate to substantially parallel to the maximum deflection angle of the mirror.

3. A method for controlling a reflective attenuator as defined in claim 2, wherein the mirror is driven to a position corresponding to a negative angle equal to the maximum deflection angle position of the substrate to achieve optimum coupling.

4. A method for controlling a reflective attenuator as defined in claim 1, wherein the mirror is driven with an increased applied voltage to an electrostatic snap in point substantially at the optimum coupling position.

5. A method for controlling a reflective attenuator as defined in claim 4, wherein the applied voltage is decreased at the snap in point without changing the position of the mirror.

6. A method for controlling a reflective attenuator as defined in claim 1, wherein the mirror is driven against a hard stop to establish a substantially fixed optimum coupling position prior to reaching the electrostatic snap in point.

7. A method for controlling a reflective attenuator as defined in claim 1, wherein the mirror is driven against a hard stop to establish a substantially fixed position beyond an optimum coupling position prior to reaching the electrostatic snap in point.

8. A reflective optical attenuator comprising:

a lens system for directing a beam of light a mirror disposed for reflecting the directed beam of light at least partially back to the lens system to a variable degree of coupling, a drive system for selectively deflecting the mirror between a minimum attenuation state wherein the reflected beam of light is directed back to the lens system at a maximum degree of coupling, and a maximum attenuation state, and a support for supporting the mirror for a movement between the minimum attenuation state and the maximum attenuation state, the support comprising at least one stop, the support and the stop disposed such that when the drive system is activated, the mirror is deflected to rest or nearly rest against the stop in a position corresponding to the maximum degree of coupling and the minimum attenuation state, and when the drive system is non-activated, the mirror is spaced from the stop in a position corresponding to the maximum attenuation state.

9. A reflective optical attenuator as defined in claim 8, wherein the support comprises a moveable substrate.

10. A reflective optical attenuator as defined in claim 9 further including means for positioning the substrate at the selected maximum deflection angle.

11. A reflective optical attenuator as defined in claim 9, wherein the substrate includes a hard stop for establishing a substantially fixed optimum coupling position for the mirror.

12. A reflective optical attenuator as defined in claim 9, wherein the mirror and substrate comprise a microelectromechanical structure.

13. A reflective optical attenuator as defined in claim 12, wherein the mirror is deflectably supported by an integral fulcrum hinge.

* * * * *